United States Patent
Li et al.

(10) Patent No.: US 12,356,315 B2
(45) Date of Patent: Jul. 8, 2025

(54) SYSTEMS AND METHODS FOR IMPROVED RANGE AND PERFORMANCE FOR LOW POWER RADIOS

(71) Applicant: Apple Inc., Cupertino, CA (US)

(72) Inventors: Lei Li, Santa Clara, CA (US); Camille Chen, Cupertino, CA (US); Siegfried Lehmann, Sunnyvale, CA (US); Yuelin Ma, Fujisawa (JP)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 18/238,456

(22) Filed: Aug. 25, 2023

(65) Prior Publication Data
US 2024/0106689 A1 Mar. 28, 2024

Related U.S. Application Data

(60) Provisional application No. 63/409,654, filed on Sep. 23, 2022.

(51) Int. Cl.
*H04W 48/10* (2009.01)
*H04L 5/00* (2006.01)
(Continued)

(52) U.S. Cl.
CPC ........... *H04W 48/10* (2013.01); *H04L 5/0017* (2013.01); *H04L 27/2278* (2013.01); *H04L 27/2662* (2013.01); *H04L 27/2695* (2013.01)

(58) Field of Classification Search
CPC .. H04W 48/10; H04L 5/0017; H04L 27/2278; H04L 257/2662; H04L 27/2695
See application file for complete search history.

(56) References Cited

U.S. PATENT DOCUMENTS 7,688,882 B2 * 3/2010 Rick .................... H04B 1/7085
375/147
9,749,717 B2 8/2017 White et al.
(Continued)

FOREIGN PATENT DOCUMENTS

WO WO 2020/205369 A1 10/2020

OTHER PUBLICATIONS

Huang et al., "EAScatter: Excitor-Aware Bluetooth Backscatter," 2022 IEEE 30th International Symposium on Quality of Service, Jun. 2022, 10 pages.
(Continued)

*Primary Examiner* — Jaison Joseph
(74) *Attorney, Agent, or Firm* — BAKERHOSTETLER

(57) ABSTRACT

Systems and methods for low power wireless device detection are provided. In one or more implementations, a transmitting/advertising device may include a device identifier and/or one or more time-offset bits in a wireless communication frame for a scanning/receiving device. The scanning/receiving device may perform sequence-level correlation operations to detect the presence of the transmitting/advertising device. The sequence-level correlation operations may detect the transmitting/advertising device based on a detection of a correlation signal peak corresponding to the device identifier, and/or based relative timing of the correlation signal peak corresponding to the device identifier and a correlation signal peak corresponding to another item in the wireless communication frame.

20 Claims, 10 Drawing Sheets

(51) Int. Cl.
*H04L 27/227* (2006.01)
*H04L 27/26* (2006.01)

(56) References Cited

U.S. PATENT DOCUMENTS

| | | | |
|---|---|---|---|
| 10,769,264 | B2 | 9/2020 | Gnanasekaran |
| 12,148,439 | B2* | 11/2024 | Wang .................... G10L 19/167 |
| 12,151,885 | B2* | 11/2024 | Lert, Jr. ................ B65G 1/0435 |
| 2011/0051635 | A1* | 3/2011 | Yang ........................ H04L 27/22 |
| | | | 370/310 |
| 2012/0051454 | A1* | 3/2012 | Zheng ................. H04L 27/2613 |
| | | | 375/295 |
| 2013/0315162 | A1* | 11/2013 | Farkas .................. H04L 5/0092 |
| | | | 370/329 |
| 2016/0050530 | A1* | 2/2016 | Corbalis ............ G06Q 20/3278 |
| | | | 455/456.1 |
| 2016/0105761 | A1* | 4/2016 | Polo ........................ H04W 4/80 |
| | | | 455/41.2 |
| 2016/0205496 | A1* | 7/2016 | Su ........................... H04W 4/80 |
| | | | 455/41.1 |
| 2018/0007499 | A1* | 1/2018 | Lee ........................ H04W 76/10 |
| 2018/0234358 | A1 | 8/2018 | Jakubov et al. |
| 2019/0346021 | A1 | 11/2019 | Li |
| 2024/0106689 | A1* | 3/2024 | Li ....................... H04L 27/2662 |
| 2024/0107470 | A1* | 3/2024 | Yang .................... H04J 3/0682 |

OTHER PUBLICATIONS

Invitation to Pay Additional Fees from PCT/US2023/032803, dated Dec. 18, 2023, 9 pages.
International Search Report and Written Opinion from PCT/US2023/032803, dated Feb. 8, 2024, 16 pages.

\* cited by examiner

SYSTEMS AND METHODS FOR IMPROVED RANGE AND PERFORMANCE FOR LOW POWER RADIOS

CROSS REFERENCE TO RELATED APPLICATIONS

This application claims the benefit of priority to U.S. Provisional Patent Application No. 63/409,654, entitled, "Systems and Methods for Improved Range and Performance for Low Power Radios", filed on Sep. 23, 2022, the disclosure of which is hereby incorporated herein in its entirety.

TECHNICAL FIELD

The present description relates generally to wireless communication, including, for example, low power wireless device detection.

BACKGROUND

Electronic devices often communicate using wireless communication protocols, such as those defined in IEEE 802.15 for Bluetooth communication.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
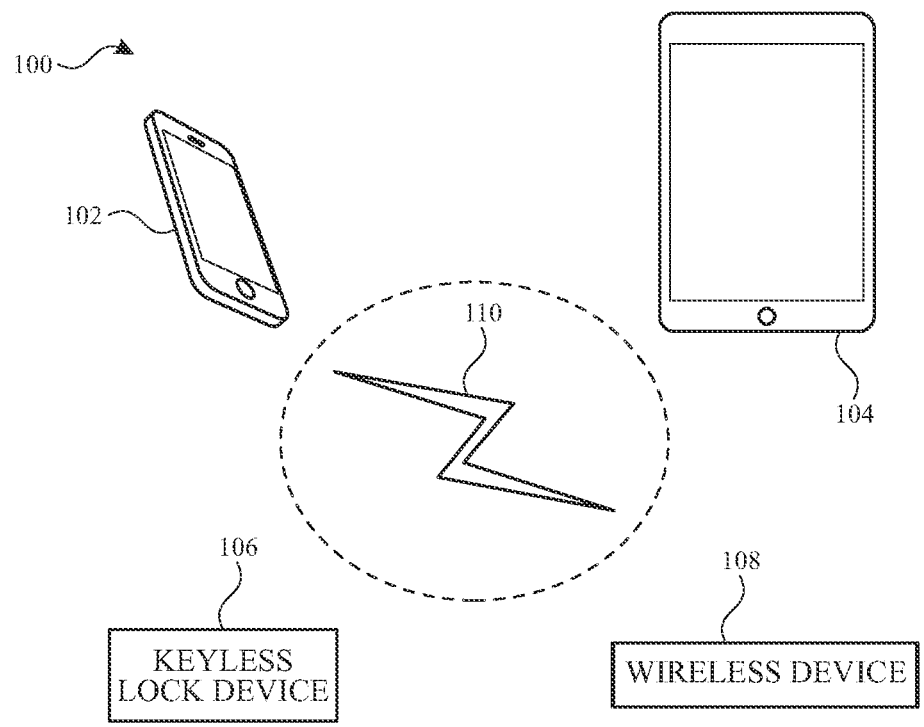
FIG. 1 illustrates an example computing environment for low power wireless device detection in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A first device and a second device may perform a pairing process that allows the first device and the second device to later establish a wireless connection at times when the devices are in proximity to each other. However, detection of a first device in proximity to a second device can be challenging in many use cases. For example, when the first device is at or near an edge of the detection range of the second device (and/or vice versa), and/or in a use case in which many potential peer devices are signaling (advertising) for detection by many other devices, existing wireless device detection methods may result in a failure of the second device to detect the first device, even when the first device is signaling for detection. For example, a device that decodes an incoming Bluetooth (BT) frame may compare individual bits in the decoded frame to known bits identifying a peer device. However, this bit-level processing can fail to detect the peer device if even a single decoded bit does not match the known bits. This can occur even when the transmitting device of the incoming Bluetooth frame is a peer device, such as when the transmitting device is at or near the edge of the detection range, or is in a crowded signal environment.

One option for increasing the range at which a peer device can be detected is to increase the power, frequency, and/or duty cycle of transmission and/or reception operations. However, this can be undesirable for devices with limited power supplies (e.g., battery powered devices), and can waste power and/or network resources since a receiving/scanning device does not know when a peer device will be transmitting and thus remains in a nearly constant state of "listening".

Aspects of the subject technology can extend the range at which peer devices can be wirelessly detected, even in crowded signal environments, and without switching to higher power transmit (TX) and/or receive (RX) operations prior to device detection. In one or more implementations, sequence-level correlation operations can be performed. For example, a peer device may be detected based on relative timings of signal peaks in an output of a sequence correlator operating on an incoming wireless communication frame. In one or more implementations, a device that is transmitting a wireless communication frame for detection may include one, two, or more than two sequences in a wireless communication frame that are configured to generate signal peaks at respective times in the output of a correlator at a receiving device (also referred to herein as a scanning device or a listening device) attempting to detect the transmitting device (also referred to herein as an advertising device). At the receiving device, the transmitting device can be detected based on a detection of one, two, three, or more than three of these correlation signal peaks, and/or based on the relative times at which the signal peaks are detected.

FIG. 1 illustrates an example computing environment for wireless device detection in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The computing environment 100 includes electronic devices 102, 104, 106, and 108 (hereinafter 102-108), configured to communicate with each other via a wireless communication connection 110. As examples, the wireless communication connection 110 may be a near-field communication (NFC) connection, a Bluetooth connection, a WiFi connection or other wireless connection. Bluetooth communication is discussed in various examples described herein. However, the disclosure is not limited to Bluetooth communication, and sequence-level detection of wireless device, and/or wireless device detection using relative timings of correlator peaks can be applied in other types of wireless communication.

As noted above, Bluetooth corresponds to a wireless communication protocol (e.g., or a set of wireless communication protocols) that enables two electronic devices to establish communication by bringing them within a relatively short proximity range (e.g., 10 m) of each other. For example, two electronic devices, such as the electronic device 102 and the electronic device 106, the electronic device 102 and the electronic device 108, the electronic device 104 and the electronic device 106, or the electronic device 104 and the electronic device 108 (as examples) may perform pairing operations so that, when the two electronic devices are again within the proximity range of each other, the two devices can detect each other and reconnect for wireless communication. In the example of FIG. 1, the wireless communication connection 110 may communicatively couple, for example, any two or more of the electronic devices 102-108. For explanatory purposes, the computing environment 100 is illustrated in FIG. 1 as including electronic devices 102-108; however, the computing environment 100 may include any number of electronic devices.

One or more of the electronic devices 102-104 may be, for example, a portable computing device such as a laptop computer, a smartphone, a smart speaker, a peripheral device (e.g., a digital camera, headphones), a tablet computer, a wearable device such as a smartwatch, a band, and the like. One or more of the electronic devices 102-104 may include one or more wireless interfaces, such as near field communication (NFC) radios, WLAN (e.g., WiFi) radios, cellular radios, Bluetooth radios, Zigbee radios, and/or other wireless radios. In FIG. 1, by way of example, the electronic device 102 is depicted as a smartphone and the electronic device 104 is depicted as a tablet device.

In the example of FIG. 1, the electronic device 106 is a keyless access device configured for Bluetooth and/or NFC communication. The keyless access device may be a powered device (e.g., battery powered) coupled to a physical lock (e.g., for access to a car, bicycle, house, and the like), and configured to lock and/or unlock the physical lock based on a wireless communication from the electronic device 102 and/or the electronic device 104.

In the example of FIG. 1, the electronic device 108 is a wireless device. For example, the wireless device may be implemented as a smart light source (e.g., a lamp, a light bulb), a smart appliance, a smart electrical outlet, a smart thermostat, a smart speaker, a network camera, or any other device (e.g., an internet-of-things (IoT) device) that is capable of wireless communication and controllable via the wireless communication. For example, one or more of the electronic devices 106-108 may include one or more wireless interfaces, such as near field communication (NFC) radios, WLAN (e.g., WiFi) radios, cellular radios, Bluetooth radios, Zigbee radios, and/or other wireless radios.

In one or more implementations, the electronic devices 102-104 may be configured to (e.g., periodically) transmit a wireless communication frame which, when detected by the other of the electronic devices 102-104, the electronic device 106 or the electronic device 108, can be used to identify the transmitting device as a peer device (e.g., a previously paired peer device).

To limit power consumption, the receiving devices may operate in a low power receive (RX) and/or listening mode in which incoming wireless communication frames are provided (at least in part) to a sequence correlator at the receiving device (e.g., at the RF/PHY layer). The sequence correlator may generate an output that includes one or more signal peaks when the incoming wireless communication frame includes one or more items that are expected for a peer device. As examples, the one or more items may include sequences corresponding to a preamble, an access address, an advertisement address, and/or a device identifier for the transmitting device, in one or more implementations.

In one or more implementations, the electronic device 106 and/or the electronic device 108 may determine that a peer device (e.g., a previously paired one of the electronic device 102 or the electronic device 104) has been detected based on the detection of one, two, three, or more than three signal peaks in the output of the correlator, and/or based on relative times at which the signal peaks are detected. For example, the transmitting device (e.g., the electronic device 102 or the electronic device 104) may include a device identifier in the wireless communication frame, and may also include one or more time-offset bits between the device identifier and one or more of the other items in the wireless communication frame. For example, the number of time-offset bits (and/or the corresponding relative times between signal peaks), can be previously agreed upon by the transmitting device and the receiving device (e.g., during a pairing process).

In, for example, Bluetooth communications, detecting a peer device includes decoding the bits of an incoming Bluetooth frame, and comparing, bit-by-bit, a portion of the decoded bits to a reference set of bits. In these Bluetooth communications, a peer device is not detected unless a bit-for-bit match of all bits is detected. However, this bit-by-bit matching can fail (e.g., by one bit or two bits) in a crowded signal environment, or when the transmitting device is at or near an edge of the range of the Bluetooth radios. However, even in these range-edge and/or crowded use cases (e.g., in which less than all of the bits may be accurately decoded), sequence-level peak detection can still identify a peer device, and thus the range of the peer detection can be extended.

Figure 2:
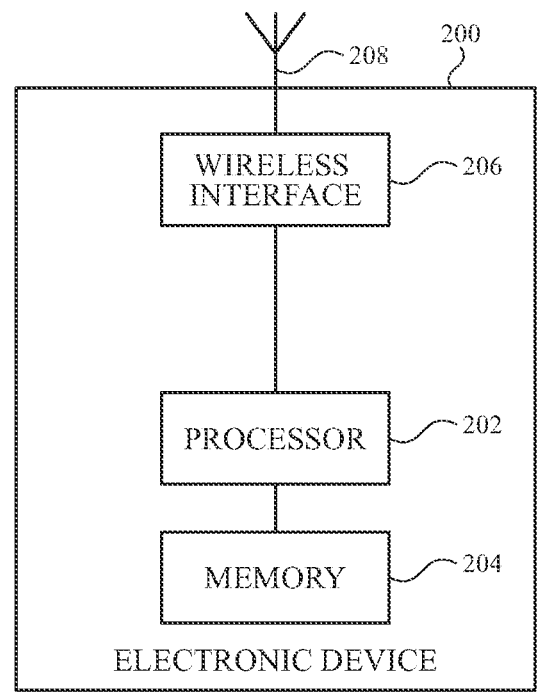
FIG. 2 illustrates an example device that may implement a system for low power wireless device detection in accordance with one or more implementations.

FIG. 2 illustrates an example device that may implement a system for wireless communication in accordance with one or more implementations. For example, the device 200 of FIG. 2 can correspond to any of the electronic devices 102-108. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, a wireless interface 206 and an antenna 208. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200. In the subject system, the processor 202 may implement architecture(s) for low power wireless device detection.

For explanatory purposes the processor 202 is illustrated as a single component. However, in one or more implementations, the processor 202 may be two or more processors, such as a host processor of the device 200 and a secure processor of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The wireless interface 206 may include suitable logic, circuitry, and/or code that enables wired or wireless communication, such as between any of the electronic devices 102-108. The wireless interface 206 may further include, for example, one or more of a Bluetooth communication interface, an NFC interface, a cellular interface, a Zigbee communication interface, a WLAN (e.g., WiFi, WiMAX, LiFi) communication interface, a USB communication interface, or generally any communication interface. The wireless interface 206 may be operably coupled to the processor 202 and may include radio frequency (RF) circuitry configured to transmit signals via the antenna 208 and/or receive signals from the antenna 208.

In one or more implementations, the wireless interface 206 may operate in various different frequencies and/or bandwidths. In one or more implementations, in order to optimize performances for the operating frequency and/or bandwidth for the wireless interface 206, the wireless interface 206 may tune the antenna 208 prior to transmitting and/or receiving. For explanatory purposes, the antenna 208 is illustrated as protruding from the device 200; however, all or part of the antenna 208 may be integrated into the device 200, such as integrated into a surface of the device 200.

In one or more implementations, an internal power supply (e.g., a battery) may be used to supply power to one or more of the processor 202, the memory 204, the wireless interface 206 and/or the antenna 208. In addition, one or more of the processor 202, the memory 204, the wireless interface 206 and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
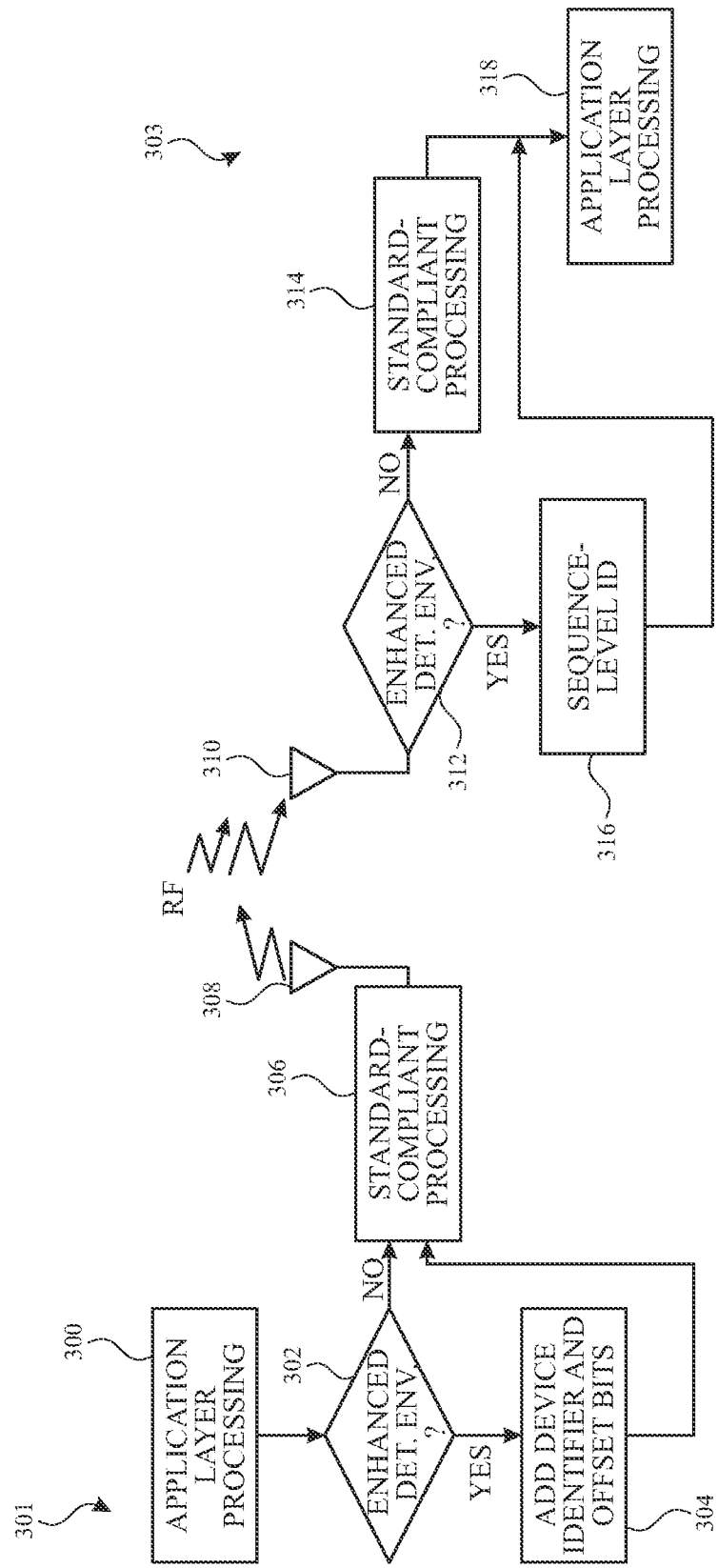
FIG. 3 illustrates a schematic diagram of a transmitting device and a receiving device performing operations for low power wireless device detection in accordance with one or more implementations.

In one or more implementations, the low power wireless device detection of the subject disclosure can be performed while maintaining compliance with one or more wireless standards, such as the Bluetooth standard. For example, FIG. 3 illustrates a schematic block diagram illustrating how sequence-level processing can be used in combination with aspects of standard compliant processing, in one or more implementations. In the example of FIG. 3, a transmitting device 301 (e.g., electronic device 102 or electronic device 104) may perform application layer processing for generating a wireless communication to a receiving device.

The transmitting device may determine (302) whether the detection environment is an enhanced detection environment. For example, determining (302) whether the detection environment is an enhanced detection environment may include determining that a use case for the device detection is a long range detection use case (e.g., for keyless access to a vehicle), and/or whether the signal environment of the electronic device is a crowded signal environment (e.g., a multi-user environment, such as a parking lot, in which many devices are transmitting detection frames). As shown, responsive to a determination that the environment is an enhanced detection environment, the transmitting device 301 may add (304) a device identifier and/or one or more offset bits (e.g., time-offset bits) to a wireless communication frame for transmission. As shown, after adding the device identifier and/or time-offset bits to the wireless communication frame, standard-compliant processing 306 may be performed for preparing the wireless communication frame for transmission and transmitting the wireless communication frame via an antenna 308 (e.g., an implementation of antenna 208 of FIG. 2). As shown in FIG. 3, in a use case in which the environment is determined not to be an enhanced detection environment, the transmitting device may proceed to the standard-compliant processing 306 without adding additional information (e.g., the device identifier and/or the offset bits) to the frame. FIG. 3 also illustrates how the device identifier and the offset bits can be added to the wireless communication frame in a manner that does not prevent the standard-compliant processing 306 from proceeding.

As shown in FIG. 3, the receiving device 303 may also determine (312) whether the environment in which the wireless communication frame is received at an antenna 310 (e.g., an implementation of the antenna 208 of FIG. 2) is an enhanced detection environment. For example, determining whether the environment is an enhanced detection environment may include determining that several (e.g., many, such as tens or hundreds) devices that are not peer devices of the receiving device 303 are transmitting detection frames for detection by other devices (e.g., that the environment is a crowded signal environment). As shown, responsive to a determination that the environment is an enhanced detection environment, the receiving device 303 may perform sequence-level identification operations 316. For example, the sequence-level identification operations 316 may use a correlator (e.g., a sequence correlator) at the receiving device to detect and determine timing positions of items (e.g., sequences) in the wireless communication frame. In one or more implementations, the relative detected timing positions (e.g., resulting from the time-offset bits included in the wireless communication frame) can carry link information for detection of the transmitting device 301. In one or more implementations, known sequences can be detected at a lower signal-to noise (SNR) ratio, as compared to detection by demodulating entire packet bits. Accordingly, aspects of the subject disclosure can significantly improve radio operational range for discovery and connection.

As shown in FIG. 3, once a peer device has been identified using the sequence-level identification operations 316, the wireless communication frame can be provided to application layer processing 318 at the receiving device 303 for further processing. FIG. 3 also shows how, in use cases in which the receiving device determines that the environment is not an enhanced detection environment (e.g., only one transmitting device is detected, the receiving device can proceed to standard-compliant processing 314 (e.g., bit-by-bit comparison) for the wireless communication frame (e.g., without preforming the sequence-level identification).

Figure 4:
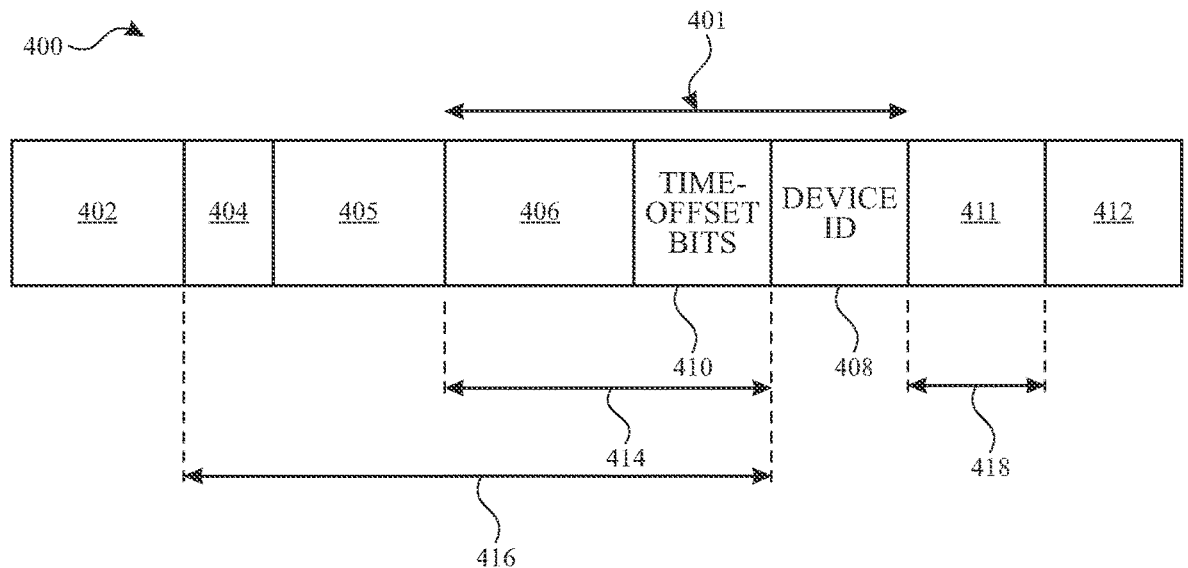
FIG. 4 illustrates an example wireless communication frame including a device identifier and offset bits in accordance with one or more implementations.

FIG. 4 illustrates an example of a wireless communication frame 400, in accordance with aspects of the disclosure. As shown in FIG. 4, the wireless communication frame 400 (e.g., a Bluetooth frame) may include various items such as an item 402, an item 404, an item 405, an item 406, an item 411, and an item 412. As shown, the wireless communication frame 400 may also include a device identifier 408, and one or more offset bits 410 (e.g., time-offset bits) for the device identifier. The offset bits 410 may be a number of bits that is selected, from a variable number of bits (e.g., up to eight bits, which may correspond to up to a sixteen microsecond delay time) during a pairing process or a last connection between the device that generates the wireless communication frame 400 and a scanning device that will later listen for the wireless communication frame 400.

For example, in one illustrative implementation, the wireless communication frame 400 may be a Bluetooth Low Energy (BLE) frame (e.g., a BLE one megabit (1M) frame), and the item 402 may include a preamble, the item 404 may include an access address, the item 405 may include a protocol data unit (PDU) header, and the item 406 may include an advertisement address. In one or more implementations, the item 405, the offset bits 410, the device identifier 408, the item 411, and the item 412 may be included in the payload 401 of the wireless communication frame 400. In the example of the BLE 1M frame, the item 411 may include payload data (e.g., including a payload header, advertisement data, other information, and/or advertainment data type information), and the item 412 may include cyclic redundancy check (CRC) bits.

As shown, the offset bits 410 are disposed between the device identifier 408 and the items 402, 404, 405, and 406. In this way, the offset bits 410 can act as time-offset bits that control the relative timing with which the device identifier 408 and the other items in the wireless communication frame 400 arrive at a receiving device. For example, the offset bits 410 may be configured to separate, by a predetermined amount 414 (e.g., first a number of bits previously agreed upon during a pairing process with another device), the location of the device identifier 408 from the location of the item 405. As another example, the offset bits 410 may be configured to separate, by a predetermined amount 416 (e.g., a second number of bits previously agreed upon during a pairing process with another device), the location of the device identifier 408 from the location of the item 402. As another example, the offset bits 410 may be configured to separate, by a predetermined amount 418 (e.g., a third number of bits previously agreed upon during a pairing process with another device), the location of the device identifier 408 from the location of the item 412 or another item that is after the device identifier 408 in the wireless communication frame 400.

As discussed herein, the presence of one or more sequences in the wireless communication frame 400 (e.g., a first sequence including the item 402 and the item 404, a second sequence including the item 405, and a third sequence including the device identifier 408), and/or the relative separations (e.g., separations by the predetermined amounts 414 and 416) may be used to identify the device transmitting the wireless communication frame 400 as a peer device of another device. For example (e.g., during a pairing process between two devices, such as between the electronic device 102 and the electronic device 106), items 402 and 404 may be defined as a first sequence for device identification, item 405 may be defined as a second sequence for device identification, the device identifier 408 may be defined as a third sequence for device identification. In one or more implementations, the predetermined amount 414 (e.g., the number of bits and/or a corresponding delay time) may be defined as an indicator for device identification, predetermined amount 416 (e.g., the number of bits and/or a corresponding delay time) may be defined as an indicator for device identification, and/or the predetermined amount 418 (e.g., the number of bits and/or a corresponding delay time) may be defined as an indicator for device identification. In one or more implementations, CRC bits can also be defined as an indicator sequence for device identification. More generally, a sequence for device identification may include known payload bits and/or a unique bit sequence (e.g., the device identifier 408) negotiated during an initial pairing process or during a last connection between two devices.

In the BLE 1M example, the wireless communication frame 400 may be designed to conform to BT requirements to coexist with BT device and protocols. For example, allowed low energy (LE) frame parts (e.g., AdvA or Adv-Data fields) may be used to embed the offset bits 410 and/or the device identifier 408. However, the BLE 1M example discussed above is merely illustrative, and a device identifier 408 and associated offset bits 410 can be included in other types of wireless communication frames (e.g., non-BT frames, and/or other types of BT frames).

As another example, the wireless communication frame 400 may be a Bluetooth low energy (LE), low power long range (LR) frame. For example, the wireless communication frame 400 may be ADV_EXT_IND packets used (e.g., on low energy long range (LELR) 500K PHY) to trigger a scanner device to detect the existence of the advertiser. As examples, an ADV_EXT_IND packet for Non-Connectable and Non-Scannable Undirected without auxiliary packet can be used with the preamble and access address as an identifying sequence and with the advertising address (AdvA) field as an identifying sequence. As another example, an ADV_EXT_IND packet for Non-Connectable and Non-Scannable Directed without auxiliary packet can be used with the preamble and access address as an identifying sequence, and with the AdvA and TargetA fields as an identifying sequence. As another example, an AUX_ADV_IND packet sent on a data channel for connection or information exchange, etc. can be used with the preamble and access address as an identifying sequence, with the advertising address (AdvA) field as an identifying sequence, with a device identifier in the payload as an identifying sequence, and with one or more offset bits (e.g., time-offset bits) that cause a separation that acts as a peer device indicator. In one or more implementations, responsive to a peer device (e.g., the advertiser) being detected using sequence correlation (e.g., once an advertiser has been initially detected using sequence correlation), the receiving device (e.g., the scanner device) may be triggered to perform more aggressive TX/RX operations, such as using higher TX power, enabling a RX external low noise amplifier (eLNA), switching to LELR 125K PHY, etc., to complete the discovery and connection process.

In one or more implementations, the data (e.g., bits) of the items 402, 404, 405, 406, 411, and/or 412, the device identifier 408, and/or the offset bits 410 can be used to modulate a carrier wave for transmission of the wireless communication frame 400, such as by feeding the data (e.g., bits) to a modulator, such as a Gaussian Frequency-shift keying (GFSK) modulator or a Differential Quaternary Phase Shift Keying (DQPSK) modulator. When a wireless communication frame, such as the wireless communication frame 400 of FIG. 4, is received at a receiving/scanning device (e.g., the electronic device 104, the electronic device 106, or the electronic device 108), some or all of the wireless communication frame 400 may be provided to a peer detector at the receiving/scanning device.

Figure 5:
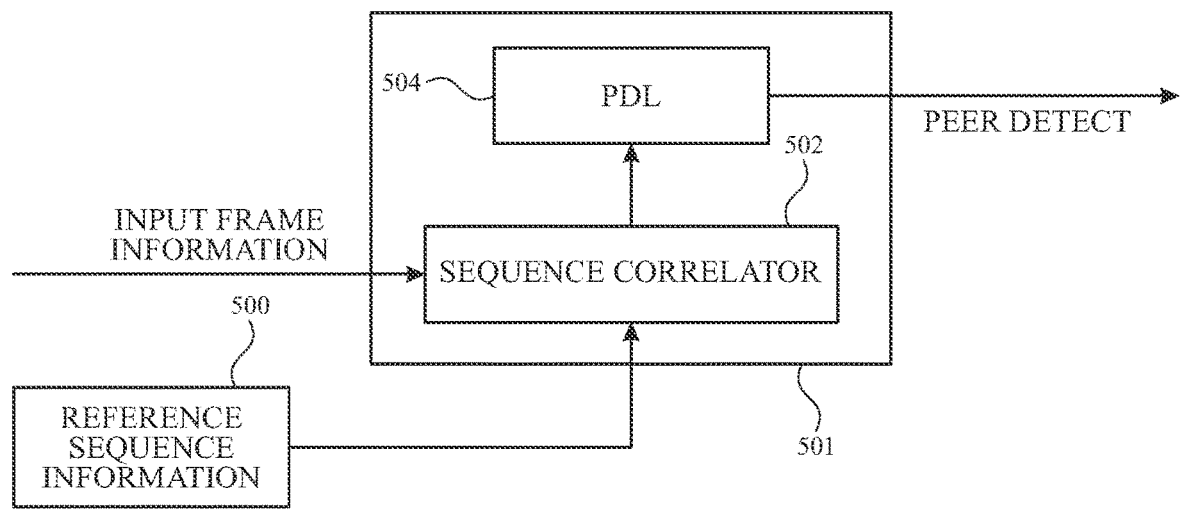
FIG. 5 illustrates a schematic block diagram of an architecture for low power wireless device detection using sequence-level correlation in accordance with one or more implementations.

For example, FIG. 5 illustrates an example peer detector 501 that may be implemented (e.g., in the RF/PHY layer) at the electronic device 102, the electronic device 104, the electronic device 106, and/or the electronic device 108. As shown, input frame information (e.g., the modulated wireless communication frame 400, in whole or in part) may be provided to a sequence correlator 502 of the peer detector 501. In one or more implementations, the sequence correlator 502 may be implemented using one or more filter, such as finite impulse response (FIR) filters. As shown, reference sequence information 500 may also be provided to the sequence correlator 502. For example, the bits corresponding to one or more expected sequences in the wireless communication frame 400 from a peer device may be provided to the same modulator used at the transmitting/advertising device to generate reference sequences, and the reference sequences may be provided to the sequence correlator 502 for correlation measurements with incoming wireless communication frames.

The sequence correlator 502 may generate an output that, if the same sequences as the references sequences are included in the wireless communication frame 400 that is provided to the sequence correlator 502, includes one or more signal peaks corresponding to each matching sequence. In this example, the modulated wireless communication frame is compared, by the sequence correlator, with the reference sequences without demodulating the wireless communication frame and/or without decoding and/or comparing individual bits of the sequences.

As discussed in further detail hereinafter (e.g., in connection with the examples of FIGS. 8, 9, and/or 10), the output of the sequence correlator 502 may include indications of any detected peaks and/or a position (e.g., in time and/or in bits) of the detected signal peak(s). As shown in FIG. 5, the output of the sequence correlator 502 may be provided to peer detection logic (PDL) 504. PDL 504 may determine whether a peer device has been detected based on the existence and/or positions of the signal peaks in the output of the sequence correlator. As shown, the PDL 504 may output a peer detect signal that indicates whether a peer device has been detected. In one or more implementations, when the peer detect signal indicates that a peer device has been detected, the receiving/scanning device may perform higher power operations (e.g., higher performance MAC techniques, such as higher frequency and/or higher duty cycle advertisement/scan and/or connection operations) to connect the peer device to the receiving/scanning device. Aspects of the subject technology may thus improve both range and performance of low power radios. For example, the range can be improved by facilitating longer range detections and/or detections in crowded signal environments. For example, performance can be improved by making power and/or other radio-control adjustments according to the improved wireless device detections described herein (e.g., by conserving power by remaining on a low power listening/scanning state for detection of devices at longer range rather than switching to higher power operations for initial wireless device detections).

Figure 6:
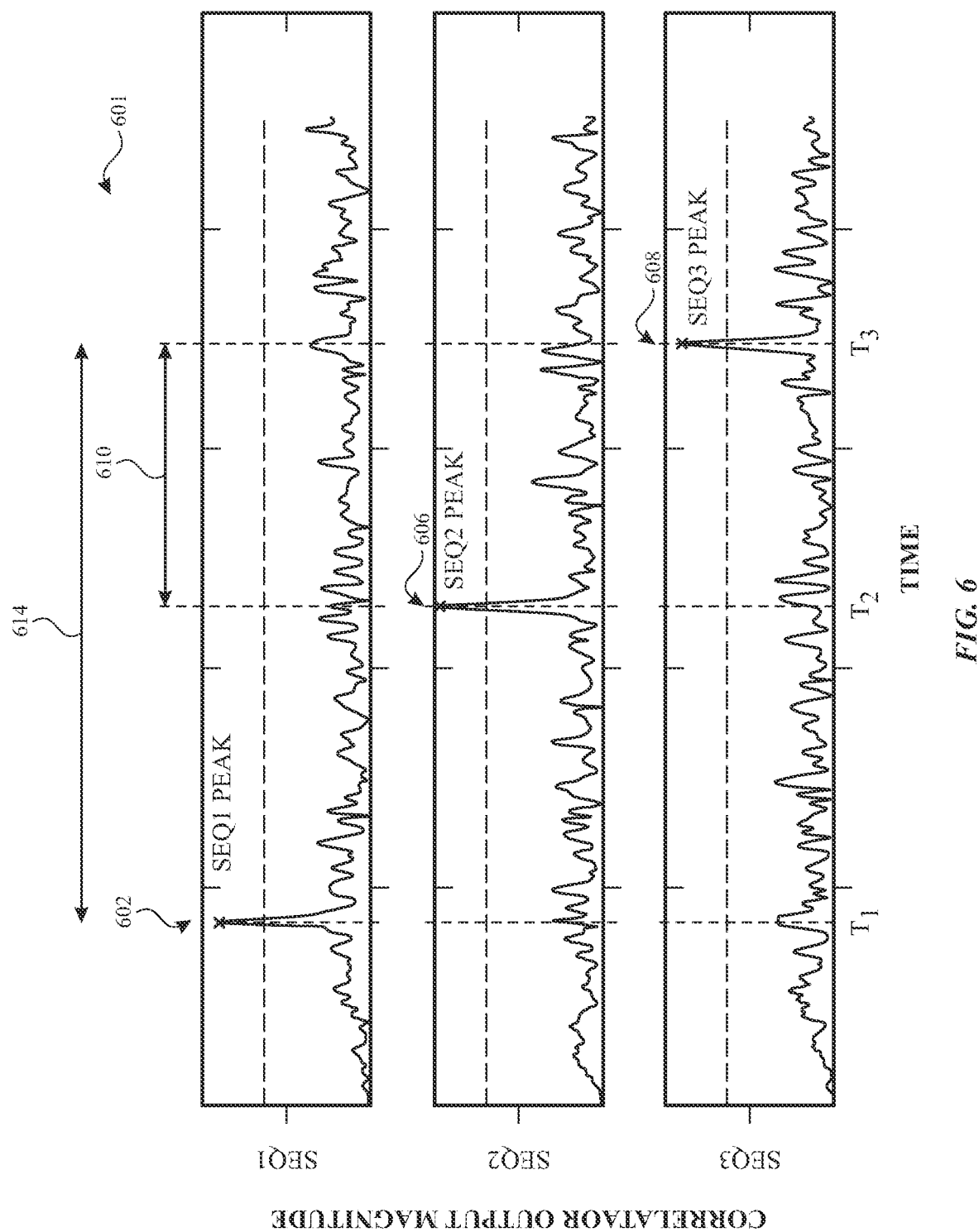
FIG. 6 illustrates an example output of a sequence correlator including a series of signal peaks in that may be used to identify a peer device in accordance with one or more implementations.

FIG. 6 illustrates an example output of the sequence correlator 502. In the example of FIG. 6, when the sequence correlator 502 finds a correlation between a first reference sequence (e.g., a preamble and access address sequence) and the wireless communication frame 400, the output 601 of the sequence correlator 502 includes a signal peak 602 (e.g., a first signal peak) at a time t1, when the sequence correlator 502 finds a correlation between a second reference sequence (e.g., an advertisement address sequence) and the wireless communication frame 400, the output 601 of the sequence correlator 502 includes a signal peak 606 (e.g., a second signal peak) at a time t2, and when the sequence correlator 502 finds a correlation between a third reference sequence (e.g., a device identifier sequence) and the wireless communication frame 400, the output 601 of the sequence correlator 502 includes a signal peak 608 (e.g., a third signal peak) at a time t3.

In this example, the time t3 of the signal peak 608 is determined, relative to the times t1 and t2 of the signal peaks 602 and 608, by the number of the offset bits 410 (e.g., time-offset bits) in the wireless communication frame 400. In this example, the PDL 504 may determine that the device that transmitted the wireless communication frame 400 (e.g., the electronic device 102) is a peer device (e.g., a previously paired device) based on the detection of the signal peak 602, based on the detection of the signal peak 606, based on the detection of the signal peak 608, based on the delay time 610 (e.g., corresponding to the predetermined amount 414 of FIG. 4) between the time t2 of the signal peak 606 and the time t3 of the signal peak 608, and/or based on the delay time 614 (e.g., corresponding to the predetermined amount 416 of FIG. 4) between the time t1 of the signal peak 602 and the time t3 of the signal peak 608. In this way, the peer device can be detected based on sequence-level correlation operation, and/or based on one or more time differences between correlator signal peaks. As discussed herein, the delay times 610 and/or 614 can be variable delay times that can vary based on a variable number of offset bits 410, and can be set for a particular peer device (e.g., during a pairing process or during a last connection) for low power wireless device detection of that particular peer device.

Figure 7:
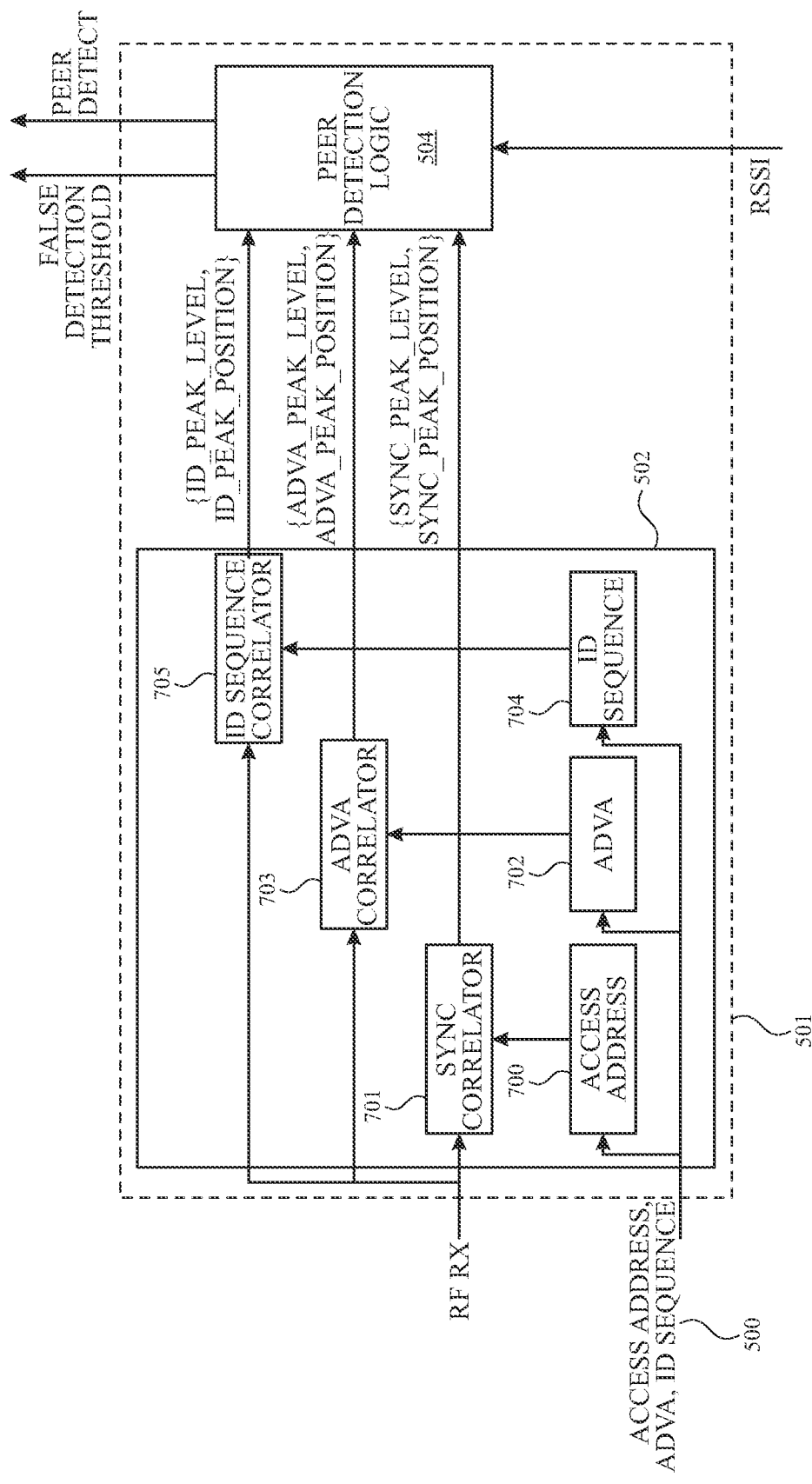
FIG. 7 illustrates a schematic block diagram of an architecture for low power wireless device detection using parallel processing for sequence-level correlation in accordance with one or more implementations.
Figure 8:
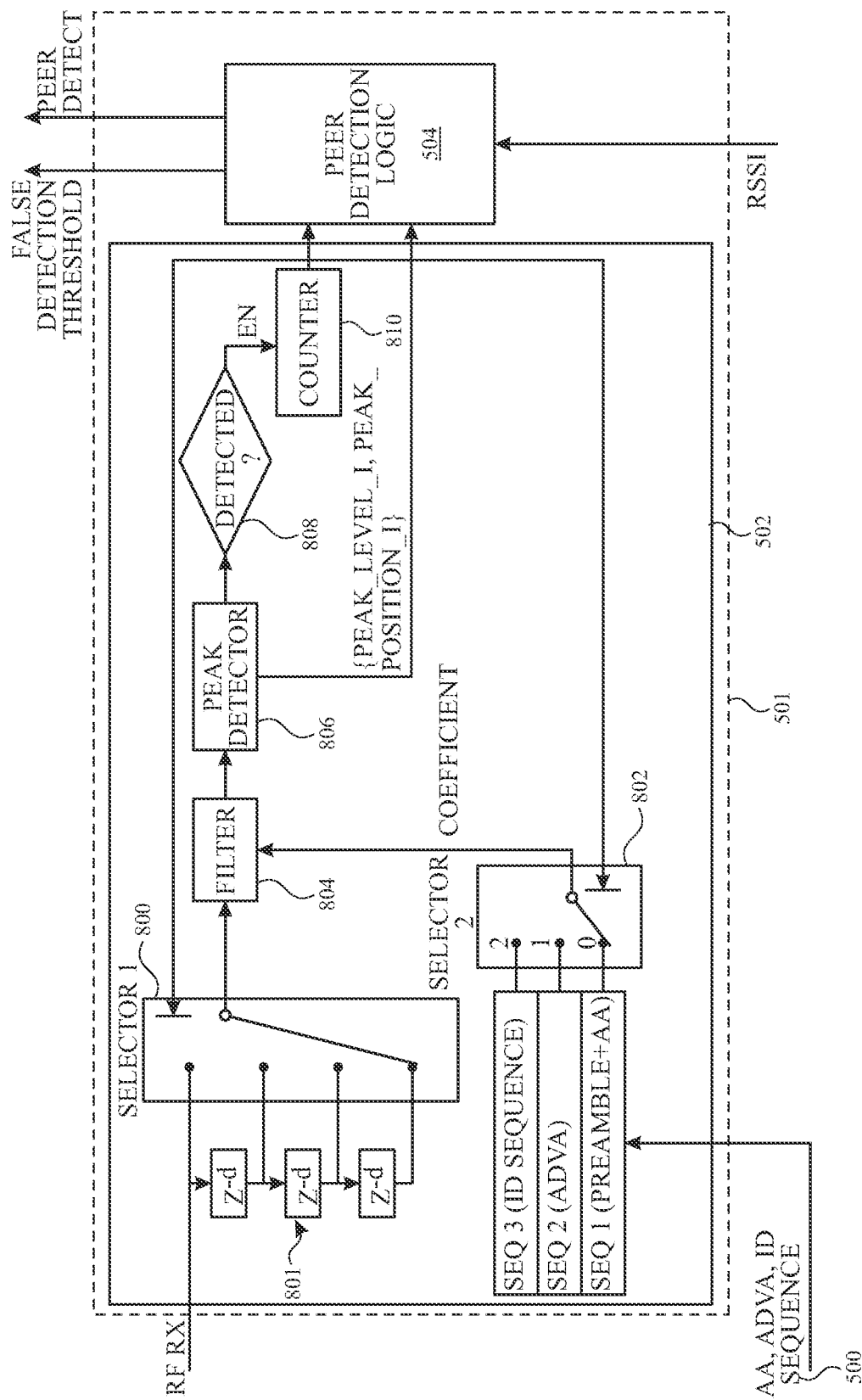
FIG. 8 illustrates a schematic block diagram of an architecture for low power wireless device detection using series processing for sequence-level correlation in accordance with one or more implementations.

FIGS. 7 and 8 illustrate schematic block diagrams of example architectures for the peer detector 501. In the example of FIG. 7, sequence correlation for multiple sequences is performed by the sequence correlator 502 in parallel. In this example, the sequence correlator 502 includes a first sequence correlator 701 (e.g., a sync correlator), a second sequence correlator 703, (e.g., an AdvA correlator), and a third sequence correlator 705 (e.g., an ID sequence correlator). As shown, the reference sequence information 500 may be provided to the sequence correlator 502, and one or more reference sequences therein or generated therefrom (e.g., a first reference sequence 700 corresponding to an access address of a peer device, a second reference sequence 702 corresponding to an advertisement address of a peer device, and a third reference sequence corresponding to a device identifier of a peer device) may be stored in memory of the sequence correlator. During (e.g., low power) listening operations, an electronic device implementing the peer detector 501 may provide an incoming RF signal to the first sequence correlator 701, the second sequence correlator 703, and the third sequence correlator 705. As shown, the first sequence correlator 701, the second sequence correlator 703, and the third sequence correlator 705 may also receive, respectively, the first reference sequence 700, the second reference sequence 702, and the third reference sequence 704. When a correlation peak is detected by the first sequence correlator 701, the second sequence correlator 703, or the third sequence correlator 705, that sequence correlator may output a peak level of the signal peak, and a position (e.g., in time) of the signal peak to the PDL 504.

In one or more implementations, the PDL 504 may determine whether a peer device has been detected based on the outputs of the first sequence correlator 701, the second sequence correlator 703, and the third sequence correlator 705. For example, the PDL 504 may determine whether a peer device has been detected based on the detection of one or more signal peaks (e.g., e.g., the signal peak 602, the signal peak 606, and/or the signal peak 608 of FIG. 6) and/or the (e.g., relative) positions of the one or more signal peaks. As shown, the PDL 504 may also receive a Received Signal Strength Indicator (RSSI) and/or a false detection threshold, and may adjust the criteria (e.g., a number of peaks, and/or whether to use relative peak timings) for peer detection based on the RSSI and/or the false detection threshold. For example, for a relatively low RSSI, relatively more peaks, and/or peak timings may be used as detection criteria (and/or vice versa). In the parallel detection architecture of FIG. 7, multiple sequences (e.g., an access address sequence, and advertisement address sequence, and/or a device ID sequence) can be detected independently, providing a robust detection for discovery and initial communication. The parallel detection architecture of FIG. 7 may also provide high performance for detection, as the multiple parallel correlators can run independently with diversity. The parallel detection architecture of FIG. 7 may also provide flexible and independent control of correlation that can mitigate false detection on, for example, an advertisement address in multi-user interference scenarios (e.g., by bypassing a first sequence correlator 701 corresponding to an access address correlator, and using only the second and/or third sequence correlators 703 and/or 705).

FIG. 8 illustrates another example architecture for the peer detector 501. In the example of FIG. 8, sequence correlation for multiple sequences is performed by the sequence correlator 502 in series. In the example of FIG. 8, as in the example of FIG. 7, reference sequence information 500 may be provided to the sequence correlator 502, and one or more reference sequences therein and/or generated therefrom (e.g., a first reference sequence 700 corresponding to an access address of a peer device, a second reference sequence 702 corresponding to an advertisement address of a peer device, and a third reference sequence corresponding to a device identifier of a peer device) may be stored in memory of the sequence correlator. During (e.g., low power) listening operations, an electronic device implementing the peer detector 501 may provide an incoming RF signal to the sequence correlator 502. In the example of FIG. 8, the incoming RF signal (which may include the wireless communication frame 400) may be fed to taps 801 that generate delay versions x(n−d), x(n−2d), x(n−3d) of the incoming RF signal.

These delay versions of the RF signal may be switchably provided, by a first selector 800, to a filter 804. In this example, the filter 804 may perform the sequence-level correlation between the incoming RF signal and the first, second, and/or third reference sequences 700, 702, and/or 704. For example, the filter 804 may be implemented as a finite impulse response (FIR) filter, and may be the same FIR filter that is used for other Bluetooth communication operations, such as time synchronization operations. In this way, the series sequence-level correlation operations of FIG. 8 can be performed using existing Bluetooth radio circuitry (e.g., in contrast with the parallel detection operations of FIG. 8, which may utilize additional correlator logic).

As shown in FIG. 8, a second selector 802 of the sequence correlator 502 may selectively provide the reference sequences (e.g., the first reference sequence 700, the second reference sequence 702, and/or the third reference sequence 704) to the filter 804. For example, by recalling the convolution and correlation functions, an inversely ordered conjugate of each of the reference sequences can be selectively used as coefficients of the filter 804. As shown in FIG. 8, the output of the filter 804 may be provided to a peak detector 806. The peak detector 806 may detect signal peaks (e.g., signal peaks 602, 606, and/or 608 of FIG. 6) in the output from the filter 804 that are larger than a predefined threshold. As illustrated in FIG. 8, in a use case in which a signal peak is detected, the peak detector 806 may record the position (e.g., in time) of the peak and output a detection indicator (e.g., a one) to a decision block 808. When the output of the peak detector 806 includes a detection indicator, the decision block 808 may trigger a counter 810. Triggering the counter 810 may cause the first selector 800 and the second selector 802 to switch to their next selector positions, for correlation with the next reference sequence. Responsive to the switching of the second selector 802, new coefficients corresponding to the next reference sequence may be loaded into the filter 804.

In one or more implementations, delaying the RX signal by the taps 801 may preserve a transition time (d) for the coefficients change. In one or more implementations, the transition time may be set to ensure the old samples in the filter's taps have flown out. During the transition time, the peak detector 806 may be turned off to avoid possible false peak detections. The series detection architecture of FIG. 8 may provide efficiencies (e.g., relative to the parallel detection architecture of FIG. 7), as no additional correlator may be needed, and the series detection may be power efficient for multiple sequence detection.

In the examples of FIGS. 7 and 8, three sequences are used. However, in other implementations, less than three, or more than three sequences may be used. In one or more implementations, the CRC of an incoming wireless communication frame may be used as a sequence for sequence level correlation. In one or more implementations, the sequence-level correlation described herein can even allow for peer detection when CRC fails.

Figure 9:
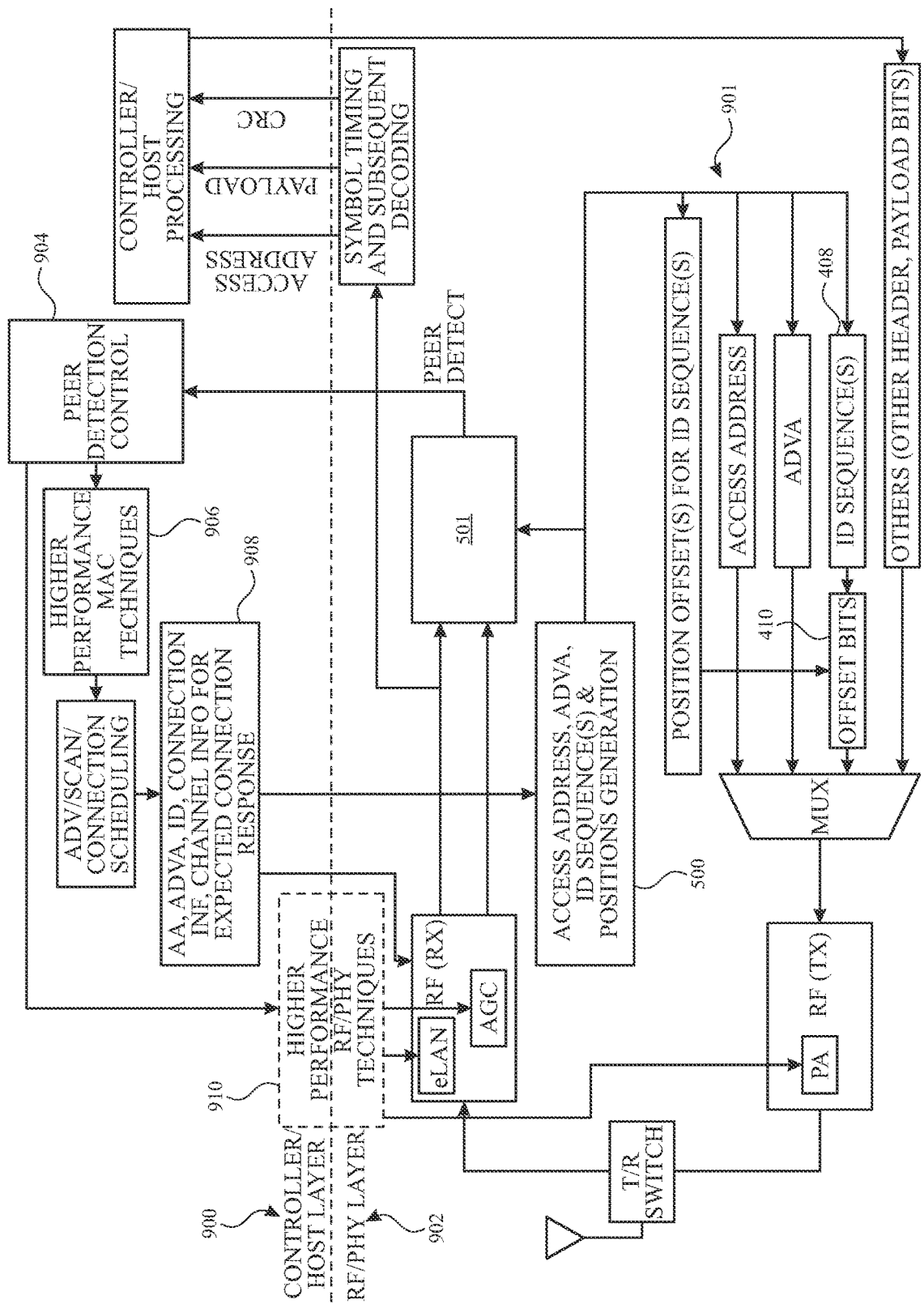
FIG. 9 illustrates a schematic block diagram of an example architecture for low power wireless device detection in accordance with one or more implementations.

FIG. 9 illustrates an example architecture for low power wireless device detection that may be implemented in any of the electronic device 102, the electronic device 104, the electronic device 106, the electronic device 108, and/or any other suitable electronic device. As shown in FIG. 9, the peer detector 501 (e.g., including the sequence correlator 502 and the PDL 504 as described in the various examples here) may be implemented the RF/PHY layer 902. As shown, a peer detect signal from the peer detector 501 may be provided to a peer detection control block 904 in the controller/host layer 900.

For example, when the peer detection control block 904 receives a peer detect signal that indicates that, based on sequence-level correlation by the peer detector 501, a peer device has been detected, the peer detection control block 904 may trigger (i) one or more increased performance and/or increased power MAC operations 906, such as increased frequency and/or increased duty cycle advertisement/scan operations, and/or (ii) one or more increased performance and/or increased power RF/PHY operations 910, such as using an external power amplifier (ePa), external low noise amplifier (eLNA), maximal ratio combining (MRC), transmit beamforming (TxBF), low energy long range (LELR), longer packets, or the like to complete the detection and/or connection to the peer device.

In the example of FIG. 9, sequence information and/or channel information 908 for an expected connection response may be provided from the controller/host layer 900 to the RF/PHY layer 902 as shown. FIG. 9 also illustrates how, in one or more implementations, transmit (TX) circuitry 901 may also be provided in the RF/PHY layer for generating a wireless communication signal, such as the wireless communication frame 400 described herein (e.g., including a device identifier 408 and/or one or more offset bits 410, for when the electronic device implementing the architecture of FIG. 9 is in transmit (TX) mode).

Figure 10:
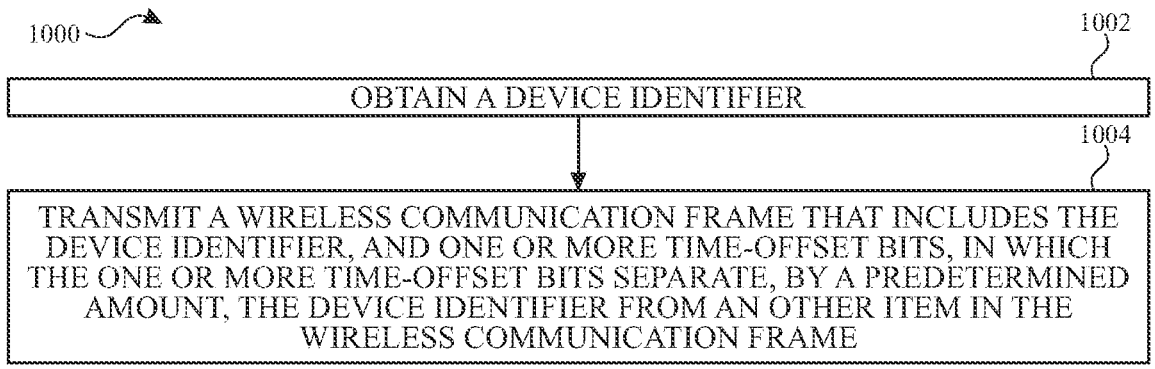
FIG. 10 illustrates a flow diagram of an example process for transmitting a wireless communication frame that includes device identifier information and offset bits in accordance with one or more implementations.

FIG. 10 illustrates a flow diagram of an example process which may be performed by a transmitting (advertising) device for low power wireless device identification in accordance with one or more implementations. For explanatory purposes, the process 1000 is primarily described herein with reference to the electronic device 102 of FIG. 1. However, the process 1000 is not limited to the electronic device 102 of FIG. 1, and one or more blocks (or operations) of the process 1000 may be performed by one or more other components of the electronic devices 102, 104 and/or by other suitable devices. Further for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

In the example of FIG. 10, at block 1002, a device identifier may be obtained. For example, the device identifier may be obtained by a device (e.g., electronic device 102) that is identified by the device identifier. For example, the device may generate the device identifier or obtain the device identifier from memory at the device. In one or more implementations, the device identifier may be an eight-bit, sixteen-bit, or twenty-four bit device identifier.

At block 1004, a wireless communication frame (e.g., wireless communication frame 400) may be transmitted. In one or more implementations, the wireless communication frame may be a Bluetooth frame (e.g., a BLE frame, or a BT LELR frame). The wireless communication frame may be transmitted from the device that obtained the device identifier. The wireless communication frame may include the device identifier, and one or more time-offset bits (e.g., offset bits 410). The one or more time-offset bits may separate, by a predetermined amount (e.g., the predetermined amount 414, such as a predetermined number of bits), the device identifier from another item (e.g., item 402 or item 405 of FIG. 4) in the wireless communication frame. For example, the predetermined amount may correspond to a predetermined delay time (e.g., delay time 610) associated with the one or more time-offset bits. For example, the predetermined delay time may indicate that the device is a peer device for another device (e.g., the electronic device 104, the electronic device 106, or the electronic device 108). For example, when the wireless communication frame is received at the other device, a time difference (e.g., a delay time) between the other item and the device identifier (e.g., due, at least in part, to the number of time-offset bits) may be an indicator to the other device that the transmitting device is a peer device. For example, the device and the other device may have previously (e.g., during a pairing process or during a previous connection between the device and the other device) determined the time difference for indicating the identity of the device as a peer device.

In one or more implementations, the other item includes an advertisement address (e.g., an advertisement address associated with the device). For example, the other item may be a sequence of bits corresponding to the advertisement address. In one or more implementations, the other item may include an access address (e.g., an access address associated with the device). In one or more implementations, the other item may also include a preamble for the wireless communication frame. For example, the other item may be a sequence of bits corresponding to the access address and/or the preamble. In one or more implementations, the device identifier and/or the time-offset bits can be embedded in the payload of the wireless communication frame. In this way, the wireless communication frame can include the device identifier and the time-offset bits, while remaining compliant with an existing standards requirement, such as one or more requirements of the Bluetooth standard.

Figure 11:
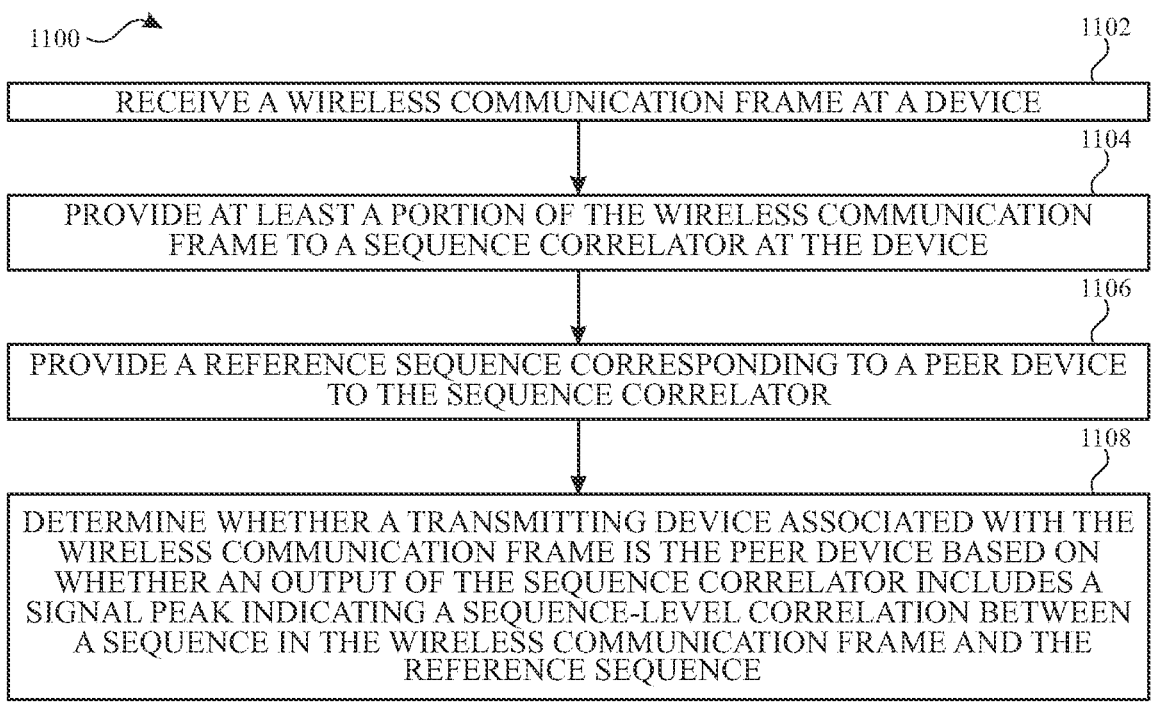
FIG. 11 illustrates a flow diagram of an example process for low power wireless device detection using sequence level processing in accordance with one or more implementations.

FIG. 11 illustrates a flow diagram of an example process which may be performed by a receiving (scanning) device for low power wireless device identification in accordance with one or more implementations. For explanatory purposes, the process 1100 is primarily described herein with reference to the electronic device 106 of FIG. 1. However, the process 1100 is not limited to the electronic device 106 of FIG. 1, and one or more blocks (or operations) of the process 1100 may be performed by the electronic device 102, the electronic device 104, the electronic device 108, and/or by other suitable devices. Further for explanatory purposes, the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

In the example of FIG. 11, at block 1102, a wireless communication frame (e.g., wireless communication frame 400, such as a Bluetooth frame) may be received at a device (e.g., the electronic device 106).

At block 1104, at least a portion of the wireless communication frame may be provided to a sequence correlator (e.g., sequence correlator 502) at the device. For example, an incoming RF signal including a carrier signal modulated by the wireless communication frame may be provided to the sequence correlator.

At block 1106, a reference sequence (e.g., first reference sequence 700, second reference sequence 702, or third reference sequence 704) corresponding to a peer device may be provided to the sequence correlator (e.g., as described herein in connection with, for example, FIGS. 5, 7. 8, and/or 9).

At block 1108, the process 1100 may include determining whether a transmitting device associated with the wireless communication frame is the peer device based on whether an output of the sequence correlator includes a signal peak (e.g., signal peak 602, signal peak 606, and/or signal peak 608) indicating a sequence-level correlation between a sequence in the wireless communication frame and the reference sequence. For example, the output may be generated with the sequence correlator without decoding individual bits of the wireless communication frame. In this way, for example, the peer device can be detected using the signal peak, at low power and even in environments in which multiple transmitting devices prevent bit-for-bit matching of identifying sequences, such as in existing Bluetooth peer device detection.

In one or more implementations, the sequence in the wireless communication frame may include an access address sequence. In one or more implementations, the wireless communication frame may include the access address sequence and a preamble sequence. In one or more implementations, the sequence in the wireless communication frame may include an advertisement address sequence. In one or more implementations, the sequence in the wireless communication frame may include a device identifier sequence (e.g., a sequence of bits corresponding to device identifier 408).

In one or more implementations, the process 1100 may also include providing a second reference sequence (e.g., another one of the first reference sequence 700, second reference sequence 702, or third reference sequence 704) corresponding to the peer device to the sequence correlator. In these implementations, determining whether the transmitting device of the wireless communication frame is the peer device further may include determining whether the transmitting device of the wireless communication frame is the peer device based on whether the output of the sequence correlator includes the signal peak (e.g., signal peak 608) indicating the sequence-level correlation between the sequence in the wireless communication frame and the reference sequence and a second signal peak (e.g., the signal peak 602 or the signal peak 606) indicating a sequence-level correlation between a second sequence in the wireless communication frame and the second reference sequence.

In one or more implementations, determining whether the transmitting device of the wireless communication frame is the peer device may also include determining whether the transmitting device of the wireless communication frame is the peer device based on a separation, in time (e.g., delay time 610 or delay time 614), between the signal peak and the second signal peak. For example, the wireless communication frame may include one or more time-offset bits (e.g., offset bits 410) that, at least in part, determine the separation, in time, between the signal peak and the second signal peak.

Figure 12:
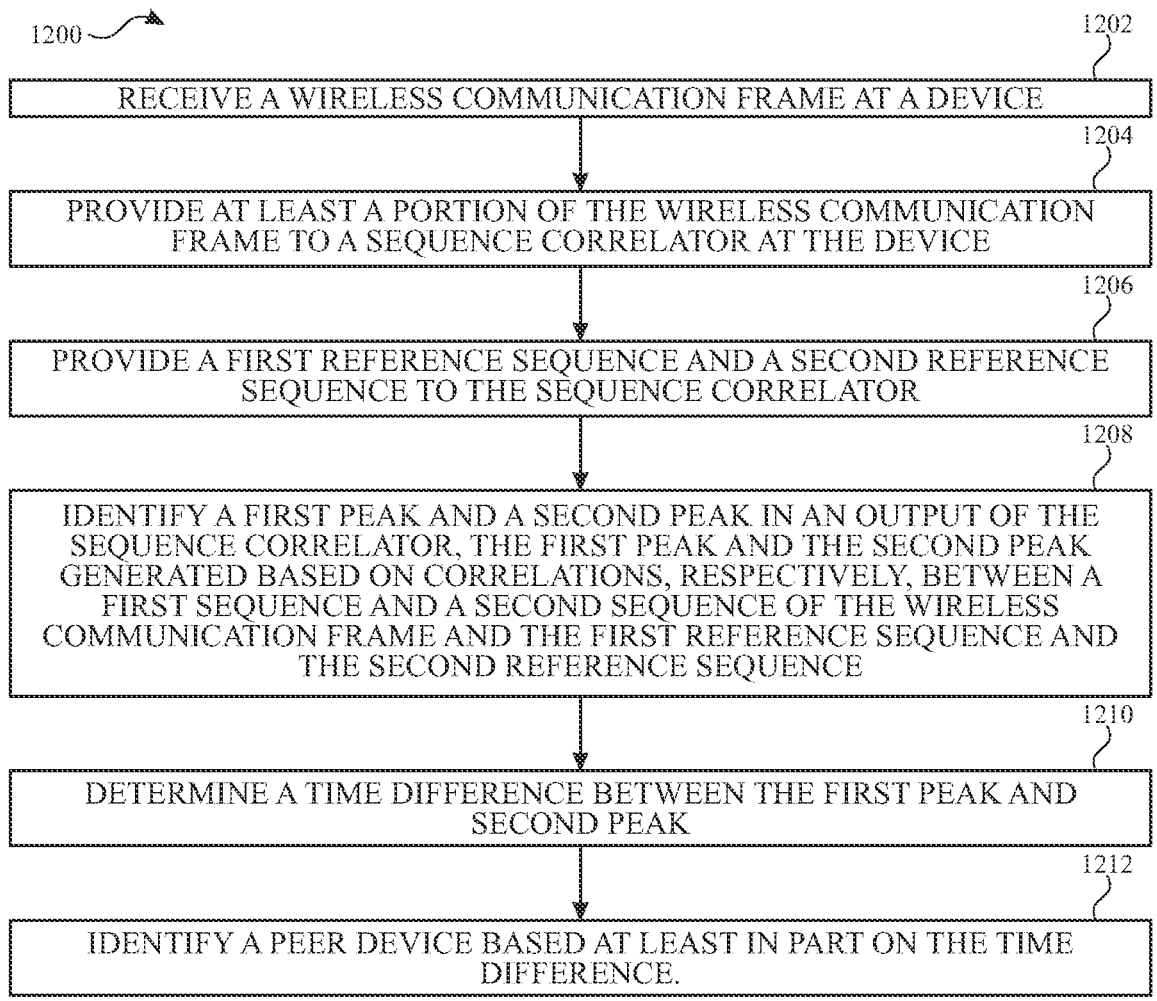
FIG. 12 illustrates a flow diagram of an example process for low power wireless device detection using correlator signal peak timing in accordance with one or more implementations.

FIG. 12 illustrates a flow diagram of another example process which may be performed by a receiving (scanning) device for low power wireless device identification in accordance with one or more implementations. For explanatory purposes, the process 1200 is primarily described herein with reference to the electronic device 106 of FIG. 1. However, the process 1200 is not limited to the electronic device 106 of FIG. 1, and one or more blocks (or operations) of the process 1200 may be performed by the electronic devices 102, 104, or 108 and/or by other suitable devices. Further for explanatory purposes, the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

In the example of FIG. 12, at block 1202, a wireless communication frame (e.g., wireless communication frame 400, such as a Bluetooth frame) may be received at a device (e.g., the electronic device 106). For example, the wireless communication frame may be received at an antenna of the device. For example, the wireless communication frame may be received as part of a carrier signal modulated according to the bits of the wireless communication frame.

At block 1204, at least a portion of the wireless communication frame may be provided to a sequence correlator (e.g., sequence correlator 502) at the device. For example, an incoming RF signal including the carrier signal modulated using the bits of the wireless communication frame may be provided to the sequence correlator.

At block 1206, a first reference sequence (e.g., second reference sequence 702 or first reference sequence 700) and a second reference sequence (e.g., third reference sequence 704) may be provided to the sequence correlator (e.g., as described herein in connection with FIGS. 5, 7, 8, and/or 9).

At block 1208, a first peak (e.g., signal peak 606 or signal peak 602) and a second peak (e.g., signal peak 608) may be identified in an output of the sequence correlator. The first peak and the second peak may be generated (e.g., by the sequence correlator) based on correlations, respectively, between a first sequence and a second sequence of the wireless communication frame and the first reference sequence and the second reference sequence. For example, the first sequence may correspond to an advertisement address and the second sequence may correspond to a device identifier (e.g., device identifier 408) of the peer device.

At block 1210, a time difference (e.g., a delay time 610 or a delay time 614) may be determined (e.g., by peer detection logic 504) between the first peak and second peak. For example, the time difference may be determined, at least in part, by a number of time-offset bits (e.g., offset bits 410) in the wireless communication frame. The time-offset bits may separate a device identifier sequence in the wireless communication frame from another item (e.g., another sequence, such as an access address sequence or an advertisement address sequence) in the wireless communication frame.

At block 1212, a peer device may be identified (e.g., by the peer detection logic 504,) based at least in part on the time difference. For example, if the time difference is the same (e.g., to within a tolerance amount) as a previously agreed upon (e.g., by the device and a peer device) time difference, the time difference may indicate that the wireless communication frame has been received from a peer device, and that a peer device has thus been detected.

In one or more implementations, the process 1200 may also include: providing a third reference sequence (e.g., first reference sequence 700) to the sequence correlator; identifying a third peak (e.g., signal peak 602) in the output generated by the sequence correlator based on a correlation between a third sequence in the wireless communication frame and the third reference sequence; determining an additional time difference (e.g., delay time 614) between the third peak and second peak; and identifying the peer device based at least in part on the time difference and the additional time difference (e.g., as described herein in connection with FIGS. 6, 7, 8, and/or 9). For example, the wireless communication frame may include one or more time-offset bits (e.g., offset bits 410) that determine, at least in part, the time difference between the first peak and the second peak. In one or more implementations, the third sequence corresponds to an access address of the peer device. In one or more other implementations, the first sequence corresponds to an access address (e.g., item 402) and the second sequence corresponds to a device identifier (e.g., device identifier 408) of the peer device.

Aspects of the present technology may include the gathering and use of data available from specific and legitimate sources for improved range and performance for low power radios. The present disclosure contemplates that in some instances, this gathered data may include personal information data that uniquely identifies or can be used to identify a specific person. Such personal information data can include image data, video data, audio data, demographic data, location-based data, online identifiers, telephone numbers, email addresses, home addresses, device identifiers, data or records relating to a user's health or level of fitness (e.g., vital signs measurements, medication information, exercise information, EMG signals), date of birth, or any other personal information.

The present disclosure recognizes that the use of such personal information data, in the present technology, can be used to the benefit of users. For example, the personal information data can be transmitted in a wireless communication. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data. For example, in the case of improved range and performance for low power radios, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 13:
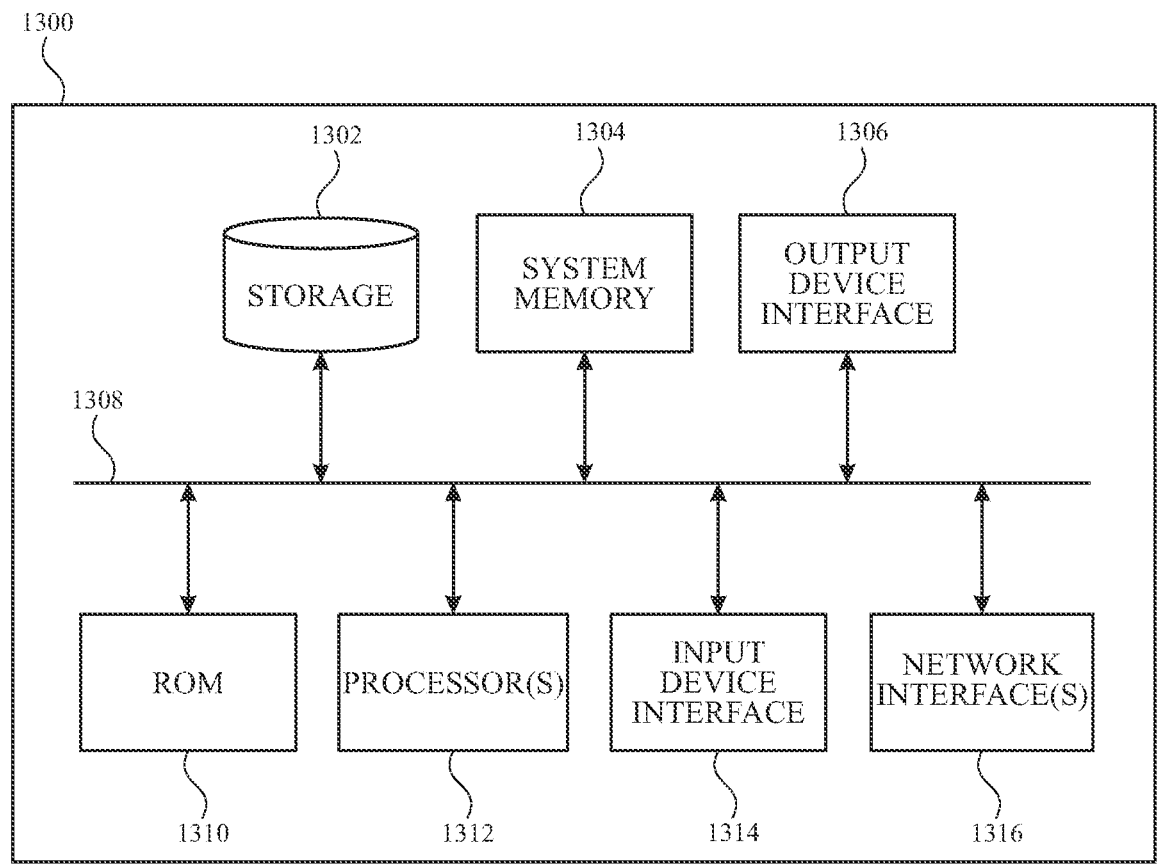
FIG. 13 illustrates an example electronic system with which aspects of the subject technology may be implemented in accordance with one or more implementations.

FIG. 13 illustrates an electronic system 1300 with which one or more implementations of the subject technology may be implemented. The electronic system 1300 can be, and/or can be a part of, one or more of the electronic devices 102-108 shown in FIG. 1. The electronic system 1300 may include various types of computer readable media and interfaces for various other types of computer readable media. The electronic system 1300 includes a bus 1308, one or more processing unit(s) 1312, a system memory 1304 (and/or buffer), a ROM 1310, a permanent storage device 1302, an input device interface 1314, an output device interface 1306, and one or more network interfaces 1316, or subsets and variations thereof.

The bus 1308 collectively represents all system, peripheral, and chipset buses that communicatively connect the numerous internal devices of the electronic system 1300. In one or more implementations, the bus 1308 communicatively connects the one or more processing unit(s) 1312 with the ROM 1310, the system memory 1304, and the permanent storage device 1302. From these various memory units, the one or more processing unit(s) 1312 retrieves instructions to execute and data to process in order to execute the processes of the subject disclosure. The one or more processing unit(s) 1312 can be a single processor or a multi-core processor in different implementations.

The ROM 1310 stores static data and instructions that are needed by the one or more processing unit(s) 1312 and other modules of the electronic system 1300. The permanent storage device 1302, on the other hand, may be a read-and-write memory device. The permanent storage device 1302 may be a non-volatile memory unit that stores instructions and data even when the electronic system 1300 is off. In one or more implementations, a mass-storage device (such as a magnetic or optical disk and its corresponding disk drive) may be used as the permanent storage device 1302.

In one or more implementations, a removable storage device (such as a floppy disk, flash drive, and its corresponding disk drive) may be used as the permanent storage device 1302. Like the permanent storage device 1302, the system memory 1304 may be a read-and-write memory device. However, unlike the permanent storage device 1302, the system memory 1304 may be a volatile read-and-write memory, such as random access memory. The system memory 1304 may store any of the instructions and data that one or more processing unit(s) 1312 may need at runtime. In one or more implementations, the processes of the subject disclosure are stored in the system memory 1304, the permanent storage device 1302, and/or the ROM 1310. From these various memory units, the one or more processing unit(s) 1312 retrieves instructions to execute and data to process in order to execute the processes of one or more implementations.

The bus 1308 also connects to the input and output device interfaces 1314 and 1306. The input device interface 1314 enables a user to communicate information and select commands to the electronic system 1300. Input devices that may be used with the input device interface 1314 may include, for example, alphanumeric keyboards and pointing devices (also called "cursor control devices"). The output device interface 1306 may enable, for example, the display of images generated by electronic system 1300. Output devices that may be used with the output device interface 1306 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 13, the bus 1308 also couples the electronic system 1300 to one or more networks and/or to one or more network nodes, through the one or more network interface(s) 1316. In this manner, the electronic system 1300 can be a part of a network of computers (such as a LAN, a wide area network ("WAN"), or an Intranet, or a network of networks, such as the Internet. Any or all components of the electronic system 1300 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method performed by a device, comprising:
   obtaining a device identifier; and
   transmitting a wireless communication frame comprising:
      the device identifier, and
      one or more time-offset bits, wherein the one or more time-offset bits separate, by
   a predetermined amount previously agreed upon during a pairing process with another device, the device identifier from an other item in the wireless communication frame.

2. The method of claim 1, wherein the predetermined amount corresponds to a predetermined delay time associated with the one or more time-offset bits.

3. The method of claim 2, wherein the predetermined delay time corresponds to a time between detection peaks at the other device, and indicates that the device is a peer device that has previously performed the pairing process with the other device.

4. The method of claim 3, wherein the other item comprises an advertisement address.

5. The method of claim 3, wherein the other item comprises an access address.

6. The method of claim 1, wherein the wireless communication frame comprises a Bluetooth frame.

7. The method of claim 1, wherein the other item in the wireless communication frame is located before the one or more time-offset bits in the wireless communication frame, and wherein the one or more time-offset bits separate, by a second predetermined amount, the device identifier from an additional item located after the one or more time-offset bits in the wireless communication frame.

8. The method of claim 1, wherein:
   the one or more time-offset bits separate, by a first predetermined number of bits previously agreed upon during the pairing process with the other device, a location of the device identifier from a location of a header of the wireless communication frame;
   the one or more time-offset bits separate, by a second predetermined number of bits previously agreed upon during the pairing process with the other device, a location of the device identifier from a location of a preamble of the wireless communication frame; and
   the one or more time-offset bits separate, by a third predetermined number of bits previously agreed upon during the pairing process with the other device, a location of the device identifier from a portion of a payload of the wireless communication frame.

9. A device, comprising:
processing circuitry configured to:
obtain a device identifier of the device; and
transmit a wireless communication frame comprising:
the device identifier, and
one or more time-offset bits, wherein the one or more time-offset bits separate, by
a predetermined amount previously agreed upon during a pairing process with another device, the device identifier from an other item in the wireless communication frame.

10. The device of claim 9, wherein the predetermined amount corresponds to a predetermined delay time associated with the one or more time-offset bits.

11. The device of claim 10, wherein the predetermined delay time indicates that the device is a peer device for an other device.

12. The device of claim 11, wherein the other item comprises an advertisement address.

13. The device of claim 11, wherein the other item comprises an access address.

14. The device of claim 9, wherein the other item in the wireless communication frame is located before the one or more time-offset bits in the wireless communication frame, and wherein the one or more time-offset bits separate, by a second predetermined amount, the device identifier from an additional item located after the one or more time-offset bits in the wireless communication frame.

15. The device of claim 9, wherein:
the one or more time-offset bits separate, by a first predetermined number of bits previously agreed upon during the pairing process with the other device, a location of the device identifier from a location of a header of the wireless communication frame;
the one or more time-offset bits separate, by a second predetermined number of bits previously agreed upon during the pairing process with the other device, a location of the device identifier from a location of a preamble of the wireless communication frame; and
the one or more time-offset bits separate, by a third predetermined number of bits previously agreed upon during the pairing process with the other device, a location of the device identifier from a portion of a payload of the wireless communication frame.

16. A non-transitory computer-readable medium storing instructions which, when executed by one or more processors, cause the one or more processors to:
obtain a device identifier of a device; and
transmit a wireless communication frame comprising:
the device identifier, and
one or more time-offset bits, wherein the one or more time-offset bits separate, by
a predetermined amount previously agreed upon during a pairing process with another device, the device identifier from an other item in the wireless communication frame.

17. The non-transitory computer-readable medium of claim 16, wherein the predetermined amount corresponds to a predetermined delay time associated with the one or more time-offset bits, and wherein the predetermined delay time indicates that the device is a peer device for an other device.

18. The non-transitory computer-readable medium of claim 17, wherein the other item comprises an advertisement address or an access address.

19. The non-transitory computer-readable medium of claim 16, wherein the other item in the wireless communication frame is located before the one or more time-offset bits in the wireless communication frame, and wherein the one or more time-offset bits separate, by a second predetermined amount, the device identifier from an additional item located after the one or more time-offset bits in the wireless communication frame.

20. The non-transitory computer-readable medium of claim 16, wherein:
the one or more time-offset bits separate, by a first predetermined number of bits previously agreed upon during the pairing process with the other device, a location of the device identifier from a location of a header of the wireless communication frame;
the one or more time-offset bits separate, by a second predetermined number of bits previously agreed upon during the pairing process with the other device, a location of the device identifier from a location of a preamble of the wireless communication frame; and
the one or more time-offset bits separate, by a third predetermined number of bits previously agreed upon during the pairing process with the other device, a location of the device identifier from a portion of a payload of the wireless communication frame.

* * * * *